United States Patent
Hori et al.

[11] Patent Number: 5,830,249
[45] Date of Patent: Nov. 3, 1998

[54] CONTROL SYSTEM FOR REVERSE WASHING MECHANISM IN DUST COLLECTING APPARATUS

[75] Inventors: Yoshiaki Hori, Tokai; Yasuo Akitsu, Handa, both of Japan

[73] Assignee: NGK Insulators, Ltd., Japan

[21] Appl. No.: 796,848

[22] Filed: Feb. 7, 1997

[30] Foreign Application Priority Data

Feb. 7, 1996 [JP] Japan .................................. 8-021530

[51] Int. Cl.⁶ .................................................. B01D 46/04
[52] U.S. Cl. ................................ 55/283; 55/302; 55/523
[58] Field of Search ............................. 55/283, 302, 523, 55/DIG. 34; 95/15, 20, 22

[56] References Cited

U.S. PATENT DOCUMENTS

| | | | |
|---|---|---|---|
| 4,277,255 | 7/1981 | Apelgren ..................................... | 55/283 |
| 4,865,627 | 9/1989 | DeWitz et al. ............................. | 55/283 |
| 5,094,675 | 3/1992 | Pitt et al. .................................... | 55/302 |
| 5,228,892 | 7/1993 | Akitsu et al. . | |
| 5,484,536 | 1/1996 | Yamaguchi et al. ...................... | 210/741 |
| 5,505,763 | 4/1996 | Reighard et al. .......................... | 55/283 |
| 5,593,471 | 1/1997 | Hori et al. ................................. | 55/302 |

FOREIGN PATENT DOCUMENTS 4-271806  9/1992  Japan .

*Primary Examiner*—C. Scott Bushey
*Attorney, Agent, or Firm*—Parkhurst & Wendel

[57] ABSTRACT

A control system for a dust collecting apparatus including an upright housing arranged above a dust storage bin, a ceramic filter assembly disposed within the housing to collect dust particles from exhaust gases supplied into a bottoms portion of the housing located upstream thereof, and a reverse washing mechanism mounted on the housing downstream of the filter assembly to cause the collected dust particles to fall into the dust storage bin from the filter assembly when it is activated, wherein temperature (T1) and pressure (P1) of the exhaust gases supplied into the housing upstream of the filter assembly, temperature (T2) and pressure (P2) of purified gases discharged from the filter assembly into an upper portion of the housing located downstream of the filter assembly and a flow quantity (Q1) of the purified gases discharged from the housing downstream of the reverse washing mechanism are detected to calculate an average temperature $T=f(T1, T2)$, a flow quantity $[(Q=f(Q1 \cdot T)]$, viscosity $(\eta=f(T)$ and a pressure loss coefficient $K=f(\Delta P, Q, \eta)$ of the exhaust gases passing through the filter assembly, and wherein the reverse washing mechanism is activated under control of an electronic controller when the calculated pressure loss coefficient (K) becomes more than a predetermined value (K0) and is deactivated when the calculated pressure loss coefficient becomes less than the predetermined value (K0).

4 Claims, 2 Drawing Sheets

CONTROL SYSTEM FOR REVERSE WASHING MECHANISM IN DUST COLLECTING APPARATUS

BACKGROUND OF TEE INVENTION

1. Field of the Invention

The present invention relates to a dust collecting apparatus for purifying various exhaust gases discharged from industrial machines, various factory plants or the like, and more particularly to a control system for a reverse washing mechanism in the dust collecting apparatus.

2. Description of the Prior Art

Disclosed in Japanese Pat. Laid-open Publication No. 4(1992)-271806 is a dust collecting apparatus of the type which includes an upright housing arranged above a dust storage bin, a ceramic filter assembly disposed within the housing to collect dust particles from exhaust gases introduced into a bottom portion of the housing located upstream thereof, and a reverse washing mechanism mounted on the housing downstream of the filter assembly to cause the collected dust particles to fall into the dust storage bin from the filter assembly when It is activated.

As the filtration efficiency of the filter assembly is lowered due to accumulation of dust particles collected in the filter assembly, the reverse washing mechanism is activated at a predetermined time interval. In the dust collecting apparatus, however, the activation timing of the reverse washing mechanism becomes too late or premature due to fluctuation of the property of exhaust gases to be purified or the supply condition of the exhaust gases such an amount of dust particles in the exhaust gases, a supply amount of the exhaust gases, temperature and pressure of the exhaust gases, etc. This results in insufficient removal of the collected dust particles or useless activation of the reverse washing mechanism.

SUMMARY OF THE INVENTION

It is, therefore, a primary object of the present invention to provide a control system for the dust collecting apparatus capable of activating the reverse washing mechanism at an optimal timing to efficiently remove collected dust particles from the filter assembly.

According to the present invention, the object is accomplished by providing a control system for a dust collecting apparatus including an upright housing arranged above a dust storage bin, a ceramic filter assembly disposed within the housing to collect dust particles from exhaust gases supplied into a bottom portion of the housing located upstream thereof, and a reverse washing mechanism mounted on the housing downstream of the filter assembly to cause the collected dust particles to fall into the dust storage bin from the filter assembly when it is activated, wherein the control system comprises first detection means for detecting temperature (T1) and pressure (P1) of the exhaust gases supplied into the bottom portion of the housing upstream of the filter assembly; second detection means for detecting temperature (T2) and pressure (P2) of purified gases discharged from the filter assembly into an upper portion of the housing located downstream of the filter assembly; third detection means for detecting a flow quantity (Q1) of the purified gases discharged from the housing downstream of the reverse washing mechanism; and an electronic controller responsive to detection signals from the first, second and third detection means for calculating an average temperature T=f(T1, T2), a flow quantity (Q=f(Q1, T), viscosity ($\eta$=f(T) and a pressure loss coefficient K=f($\Delta$P, Q, $\eta$) of the exhaust gases passing through the filter assembly on a basis of the detected temperature (T1, T2), pressure (P1, P2) and flow quantity (Q1) and for activating the reverse washing mechanism when the calculated pressure loss coefficient becomes more than a predetermined value (K0) and deactivating the reverse washing mechanism when the calculated pressure loss coefficient becomes less than the predetermined value (K0).

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
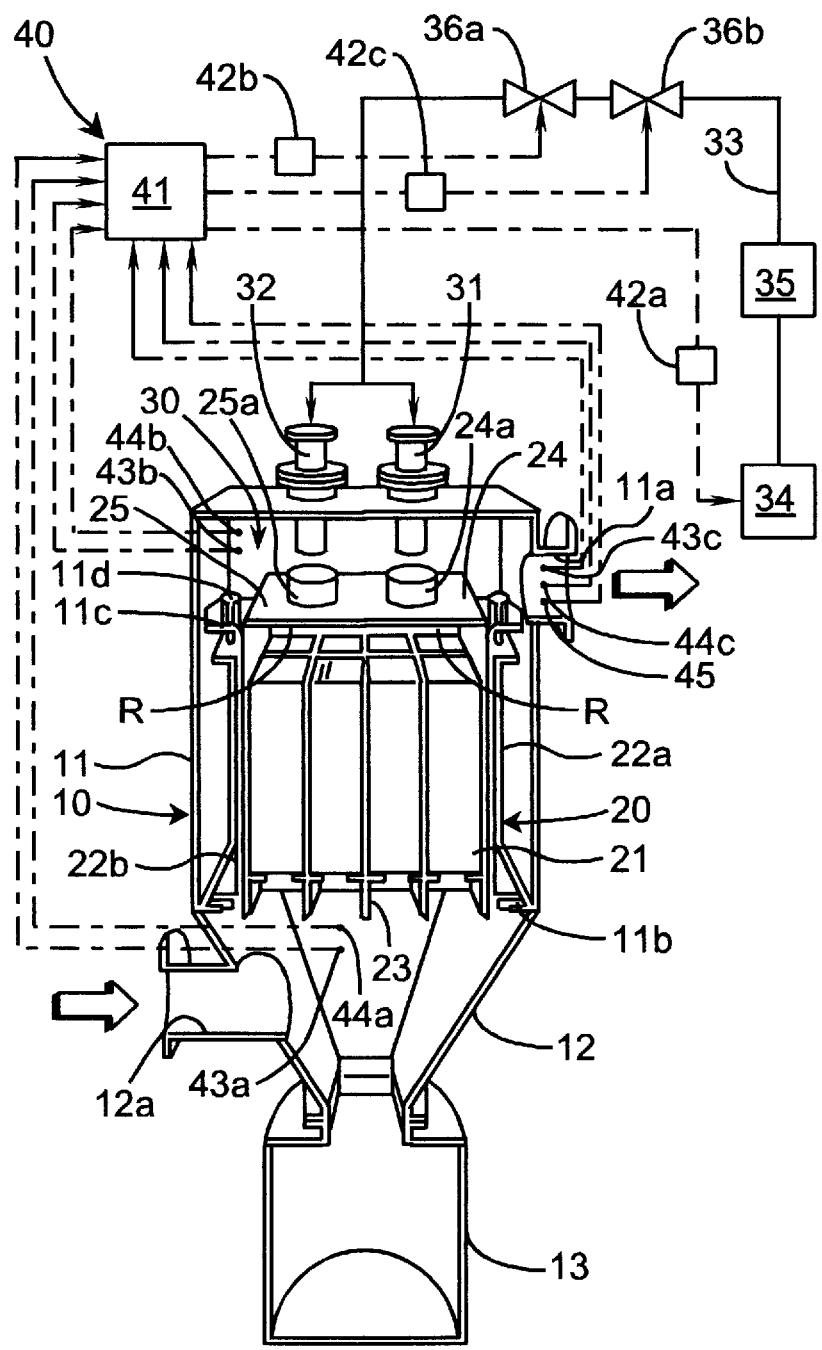
FIG. 1 is a schematic illustration of a control system for a reverse washing mechanism in a dust collecting apparatus.

In FIG. 1 of the drawings, there is schematically illustrated a dust collecting apparatus of the type which includes a upright housing 10, a filter assembly 20 disposed within the housing 10, a reverse washing mechanism 80 mounted on the housing 10 and a control system 40 for the reverse washing mechanism 30. The housing 10 is composed of a housing body 11 of square cross-section mounted on a frame construction (not shown) and a pyramidal hopper 12 assembled with the bottom portion of housing body 11 and located above a dust storage bin 13. The housing body 1 has an outlet port 11a formed at its peripheral wall to discharge purified gases therefrom, and the hopper 12 has an inlet port 12a formed at its peripheral wall to be supplied with exhaust gases.

The filter assembly 20 is arranged between the inlet and outlet ports 12a and 11a of housing body 11. The filter assembly 20 is composed of a plurality of ceramic filter elements 21 aligned in parallel and clamped by a pair of side plates 22a and 22b. The side plates 22a and 22b each are formed in an L-letter shape in cross-section. The side plates 22a and 22b are integrally assembled to form a square frame having inlet and outlet openings at opposite ends thereof. The ceramic filter elements 21 each are made of porous ceramic material and have a thin-walled cellular or honeycomb structure of square cross-section formed with a plurality of axially extending passages separated from each other by thin partition walls. A first group of the filter passages are in the form of inlet passages which are closed at their upper ends in a checked pattern and opened at their lower ends to introduce the exhaust gases therein, while a second group of the filter passages are in the form of outlet passages which are closed at their lower ends in a checked pattern and opened at their upper ends to discharge purified gases therefrom. The thin partition walls of filter elements 21 each act as a filter to collect dust particles from the exhaust gases permeating therethrough.

The clamped filter elements 21 are supported by a support frame 23 mounted on a lower flange 11b of housing body 11, and the side plates 22a, 22b are fixed to an upper flange 11c of housing body 11 by means of fastening bolts 11d. The upper ends of filter elements 21 are covered with a pair of boxes 24 and 25 which are mounted on the upper ends of side plates 22a and 22b in an air-tight manner. The upper walls of boxes 24, 25 are spaced in a predetermined distance from the upper ends of filter elements 21 to form a pair of closed chambers R. A pair of discharge pipes 24a and 25a are provided on the upper walls of boxes 24 and 25 to permit the flow of purified gases discharged therethrough toward the outlet port 11a of housing body 11.

The reverse washing mechanism 30 includes a pair of air spout pipes 31 and 32 mounted on the upper wall of housing body 11 and extended into the closed chambers R to supply Jet streams of compressed air into the discharge pipes 24a and 25a. An air supply conduit 33 is connected at its one end to the air spout pipes 31, 32 and at its other end to a compressor 34 through an air accumulation tank 35. The air supply conduit 33 is provided with a cut-off valve 36a and a flow control valve 36b which are respectively in the form of an electromagnetic valve. In operation of the compressor 34, the cut-off valve 36a and flow control valve 36b are opened under control of an electronic controller 41 of the control system 40 to supply compressed air from the compressor 34 into the air spout pipes 31 and 32 therethrough. The compressed air spouts out of the air spout pipes 31, 32 into the discharge pipes 24a, 25a and flows into the outlet passages of filter elements 21 to flow into the inlet passages of filter elements 21 through the partition walls. Thus, dust particles collected from the exhaust gases are separated from the partition walls of filter elements 21 and fall into the dust storage bin 13.

The control system 40 for the reverse washing mechanism 30 includes driving circuits 42a, 42b and 42c connected to the electronic controller 41 for control of the compressor 34, cut-off valve 36a and flow control valve 36b. The electronic controller 41 is in the form of a microcomputer which is connected to a first temperature sensor 43a and a first pressure sensor 44a disposed within the housing 10 at the upstream of the filter assembly 20, a second temperature sensor 43b and a second pressure sensor 44b disposed within the housing 10 at the downstream of the filter assembly 20 and a third temperature sensor 43c, a third pressure sensor 44c and a flow quantity sensor 45 disposed within the outlet port 11a of housing 10 at the downstream of the air spout pipes 31, 32.

The first temperature sensor 43a and pressure sensor 44a are arranged to detect temperature T1 and pressure P1 of exhaust gases supplied into the inlet port 12a of housing 10 at the upstream of filter assembly 20. The second temperature sensor 43b and pressure sensor 44b are arranged to detect temperature T2 and pressure P2 of purified gases discharged from the filter elements 21 at the downstream thereof. The third temperature sensor 43c and pressure sensor 44c are arranged to detect temperature T3 and pressure P3 of the purified gases discharged from the outlet port 11a of housing body 11 at the downstream of the reverse washing mechanism 30. The flow quantity sensor 45 is arranged to detect a flow quantity of purified gases discharged from the outlet port 11a of housing body 11.

Figure 2:
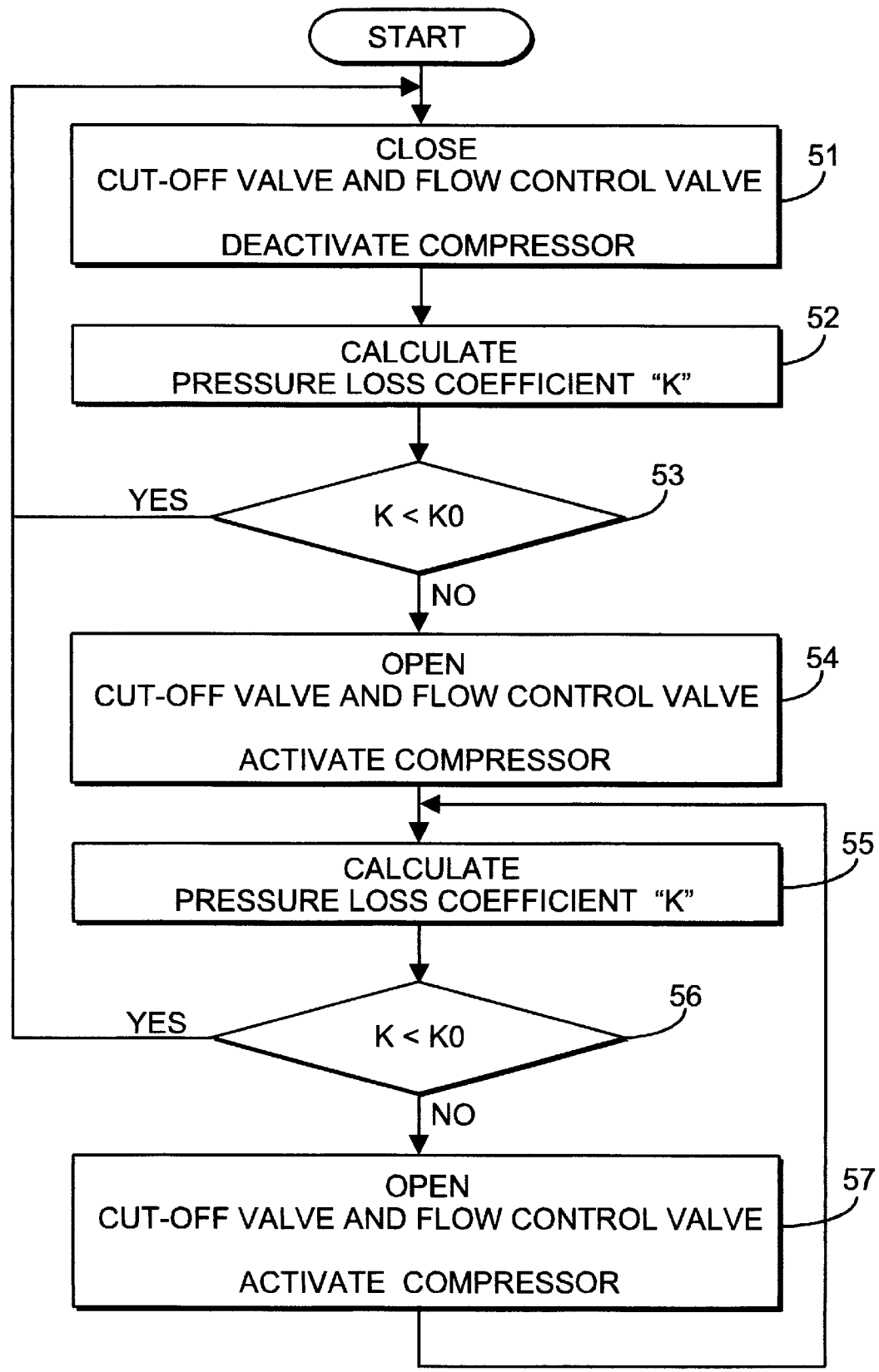
FIG. 2 is a flow chart of a control program executed by an electronic controller shown in FIG. 1.

The electronic controller 41 is programmed to execute a control program shown by a flow chart in FIG. 2. During execution of the control program, the electric controller 41 calculates an average temperature T=f(T1, T2), a flow quantity Q=f(Q1, T3, T, P3), viscosity $\eta$=f(T) and a pressure loss coefficient K=F($\Delta$P, Q, $\eta$) of exhaust gases passing through the filter assembly 20 in response to detection signals applied from the temperature sensors 43a–43c, pressure sensors 44a–44c and flow quantity sensor 45 and compares the calculated pressure loss coefficient K with a predetermined value of pressure loss coefficient K0 to activate the reverse washing mechanism 30 when the calculated pressure loss coefficient K becomes more than the predetermined value K0 and to deactivate the reverse washing mechanism 30 when the calculated pressure loss coefficient K becomes less than the predetermined value K0.

In operation of the dust collecting apparatus, exhaust gases discharged from a diesel engine installed in a factory plant are introduced into the bottom portion of housing 10 through the inlet port 12 and introduced into the inlet passages of the filter elements 21. In this instance, the thin partition walls of filter elements 21 act to collect dust particles from the exhaust gases permeating therethrough into the outlet passages of filter elements 21 for purifying the exhaust gases. Thus, the purified gases are discharged from the outlet passages of filter elements 21 into the closed chambers R while the dust particles are accumulated on the surfaces of the partition walls. The purified gases are discharged into the upper portion of housing body 11 from the closed chambers R through the discharge pipes 24a, 25a and discharged outwardly through the outlet port 11a of housing body 11.

During such treatment of the exhaust gases, the reverse washing mechanism 30 is activated under control of the electronic controller 41 to separate the accumulated dust particles from the partition walls of filter elements 21 and cause them to fall into the dust storage bin 13. Assuming that the controller 41 of the control system 40 has started to execute the control program shown in FIG. 2 in operation of the dust collecting apparatus, the control program is initialized at step 51 to deactivate the compressor 34 and to close the cut-off valve 36a and flow control valve 36b. When the program proceeds to step 52, the controller 41 calculates an average temperature T=f(T1, T2), a flow quantity Q=f(Q2, T3, T, P3), viscosity $\eta$=f(T) and a pressure loss coefficient K=f($\Delta$P, Q, $\eta$) of the exhaust gases passing through the filter elements 21 in response to detection signals applied from the temperature sensors 43a–43c, pressure sensors 44a–44c and flow quantity sensor 45. Subsequently, the controller 41 determines at step 53 whether the calculated pressure loss coefficient K is less than the predetermined value K0 or not. If the answer at step 53 is "Yes", the controller 41 returns the program to step 51 to maintain the reverse washing mechanism 30 in a deactivated condition.

When the calculated pressure loss coefficient K becomes more than the predetermined value K0, the controller 41 determines a "No" answer at step 53 and causes the program to proceed to step 54. At step 54, the controller 41 activates the compressor 34 of the reverse washing mechanism 30 for a predetermined period of time and opens the cut-off valve 35a and flow control valve 36b to supply therethrough compressed air into the spout pipes 31 and 32 from the compressor 34 under a constant pressure. The compressed air is supplied into the discharge pipes 24a, 25a from the spout pipes 31, 32 and flows into the outlet passages of filter elements 21. Thus, the accumulated dust particles are separated from the partition walls of filter elements 21 under the supply of compressed air and fall into the dust storage bin 13.

When the compressor 34 is deactivated after lapse of the predetermined period of time, the controller 41 calculates at step 55 the pressure loss coefficient K and determines at step 56 whether the calculated pressure loss coefficient K is less than the predetermined value K0 or not. When the calculated pressure loss coefficient K becomes less than the predetermined value K0, the controller 41 determines a "Yes" answer at step 56 and returns the program to step 51 to deactivate the compressor 34 and to close the cut-off valve 36a and flow control valve 36b. If the calculated pressure loss coefficient K is still more than the predetermined value K0, the controller 41 determines a "No" answer at step 56 and causes the program to proceed to step 57. At step 57, the controller 41 further activates the compressor 34 for the predetermined period of time and controls the opening degree of the flow control valve 36b to increase the pressure of compressed air applied to the filter elements 21 at the downstream thereof.

When the compressor 34 is deactivated after lapse of the predetermined period of time, the controller 41 returns the program to step 55 to subsequently calculate the pressure loss coefficient K. When the calculated pressure loss coefficient K becomes less than the predetermined value K0, the controller 41 determines a "Yes" answer at step 56 and returns the program to step 51 to deactivate the compressor 34 and to close the cut-off valve 36a and flow control valve 36b. This results in deactivation of the reverse washing mechanism 30. Subsequently, the controller 41 will repeat execution of the processing at step 52 to 57 in the same manner as described above.

From the above description, it will be understood that with the control system for the reverse washing mechanism, the temperature T1 and pressure P1 of the exhaust gases upstream of the filter assembly 20, the temperature T2 and pressure P2 of the purified gases downstream of the filter assembly 20 and the temperature T3, pressure P3 and flow quantity Q1 of the purified gases downstream of the reverse washing mechanism 30 are detected by the temperature sensors 43a–43c, pressure sensors 44a–44c and flow quantity sensor 45 to calculate the average temperature (T=f(T1, T2), flow quantity Q=f(Q1, T3, T, P3), viscosity η=f(T) and pressure loss coefficient K=(ΔP, Q, η) and that the reverse washing mechanism 30 is activated when the calculated pressure loss coefficient K becomes more than the predetermined value K0 and is deactivated when the calculated pressure loss coefficient K becomes less than the predetermined value K0. Since the pressure loss coefficient K is calculated as a constant value irrespectively of the supply pressure and amount of the exhaust gases, the amount of dust particles contained in the exhaust gases, the temperature and viscosity of the exhaust gases, etc., the reverse washing mechanism 30 can be activated at an optimal timing on a basis of calculation of the pressure loss coefficient K to efficiently remove the collected dust particles from the filter assembly 20.

What is claimed is:

1. A control system for a dust collecting apparatus including an upright housing arranged above a dust storage bin, a ceramic filter assembly disposed within said housing to collect dust particles from exhaust gases supplied into a bottom portion of said housing located upstream thereof, and a reverse washing mechanism mounted on said housing downstream of said filter assembly to cause the collected dust particles to fall into said dust storage bin from said filter assembly when it is activated, wherein the control system comprises:
first detection means for detecting temperature (T1) and pressure (P1) of the exhaust gases upstream of said filter assembly;
second detection means for detecting temperature (T2) and pressure (P2) of purified gases discharged from said filter assembly into an upper portion of said housing located downstream of said filter assembly;
third detection means for detecting a flow quantity (Q1) of the purified gases discharged from said housing downstream of said reverse washing mechanism; and
an electronic controller responsive to detection signals applied from said first, second and third detection means for calculating an average temperature T=f (T1, T2), a flow quantity (Q=f(Q1, T), viscosity (η=f(T) and a pressure loss coefficient K=f(ΔP, Q, η) of the exhaust gases passing through said filter assembly on a basis of the detected temperature (T1, T2), pressure (P1, P2) and flow quantity (Q1) and for activating said reverse washing mechanism when the calculated pressure loss coefficient becomes more than a predetermined value (K0) and deactivating said reverse washing mechanism when the calculated pressure loss coefficient becomes less than the predetermined value (K0).

2. A control system for a dust collecting apparatus as claimed in claim 1, wherein said third detection means includes means for detecting temperature (T3) and pressure (P3) of the purified gases discharged from said housing downstream of said filter assembly, and wherein said electronic controller is responsive to detection signals applied from said first, second and third detection means for calculating the average temperature (T), flow quantity (Q), viscosity (η) and pressure loss coefficient (K) of the exhaust gases passing through said filter assembly on a basis of the detected temperature (T1, T2, T3), pressure (P1, P2, P3) and flow quantity (Q1).

3. A control system for a dust collecting apparatus as claimed in claim 1, wherein said reverse washing mechanism is activated under control of said electronic controller to cause the collected dust particles to fall into said dust storage bin under a constant pressure.

4. A control system for a dust collecting apparatus as claimed in claim 1, wherein the activation of said reverse washing mechanism is controlled by said electronic controller to increase compressed air applied to said filter assembly downstream thereof when the calculated pressure loss coefficient (K) is more than the predetermined value (K0) after the collected dust particles have been separated from said filter assembly under the constant pressure.

* * * * *